Patented July 4, 1950

2,514,210

UNITED STATES PATENT OFFICE 2,514,210

STABILIZATION OF SYNTHETIC RUBBERS

Harry E. Albert, Akron, Ohio, assignor to The Firestone Tire & Rubber Company, Akron, Ohio, a corporation of Ohio No Drawing. Original application November 15, 1947, Serial No. 786,339. Divided and this application November 2, 1949, Serial No. 129,201

10 Claims. (Cl. 260—45.75)

This invention relates to the stabilization of synthetic rubbers and, particularly, the rubber-like copolymer of butadiene and styrene known as GR-S. More generally, it relates to the stabilization of any rubber-like copolymer of a conjugated diene—for example, 1,3-butadiene, isoprene, 2-cyanobutadiene-1,3, cyclopentadiene-1,3, piperlyene, dimethylbutadiene-1,3, 2-methyl-1,3-pentadiene, etc.—and a vinyl aromatic monomer—for example, styrene, alpha-methyl styrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc. The stabilizer used is a stannous diphenol sulfoxide. The invention includes the process of stabilization and the stabilized copolymer, whether it be cured or uncured.

Various stabilizers have been used for synthetic rubbers. Even those most widely used are not satisfactory in light-colored stocks because they discolor, particularly on exposure to ultraviolet light. They cause discoloration of the copolymer before curing, and they cause discoloration of the vulcanizate. The stabilizers of this invention are substantially non-discoloring and may be used in light-colored stocks.

The preferred stabilizers are stannous diphenol sulfoxide, the stannous di(halogen-substituted phenol) sulfoxides, and the stannous di(hydrocarbon-substituted phenol) sulfoxides in which the total of the carbons in the substituents in each phenol nucleus does not exceed twenty. These include valuable stannous di-alkylphenol sulfoxides. The stabilizers include, for example:

stannous di(p-phenylphenol) sulfoxide
stannous di(p-stearylphenol) sulfoxide
stannous di(2,4-tert-octylphenol) sulfoxide
stannous di(4-tert-butylphenol) sulfoxide
stannous di(4-tert-amylphenol) sulfoxide
stannous di(4-tert-octylphenol) sulfoxide
stannous di(p-cresol) sulfoxide
stannous di(o-cresol) sulfoxide
stannous di(m-cresol) sulfoxide
stannous di(4-tert-butyl-3-methylphenol) sulfoxide
stannous di(p-chlorophenol) sulfoxide
stannous di(p-sec-butylphenol) sulfoxide Other alkyl- and halo- substituted diphenol sulfoxides, etc. including di(halo-and-alkyl-substituted phenol) sulfoxides may be used.

Ordinarily, the stabilizer will be added to the latex resulting from emulsion copolymerization of the monomers. Thus, it will be present in the coagulum during drying and subsequent storage when deterioration would occur if no stabilizer were present. If preferred, the stabilizer may be incorporated in the rubber by milling or in any other desirable fashion. The amount of stabilizer employed may vary from about 0.1 to 10 per cent. Ordinarily, about 2 per cent will give very satisfactory results.

The stannous diphenol sulfoxide is preferably prepared from stannous chloride and the alkali metal salt of the sulfoxide under anhydrous conditions. However, active compounds, undoubtedly containing some partially hydrolyzed salt, can be obtained using an aqueous medium. Reference to the stannous compound includes such partially hydrolyzed salts.

The following illustrates the preparation of the sulfoxide:

STANNOUS DIPHENOL SULFOXIDE

One and seven-tenths grams of sodium hydroxide in 200 milliliters of distilled water was used to dissolve 6 grams of di(p-hydroxyphenyl) sulfoxide. Eight grams of stannous chloride ($SnCl_2$) were dissolved in 15 to 20 milliliters of distilled water and added to the above solution slowly during stirring. The white precipitate formed was filtered off, washed with water, and dried at 50 to 60° C. for 5 hours. It weighed 9.3 grams and was a very light cream color.

The stannous salt of diphenol sulfoxide may also be made in the following manner:

Four and six-tenths grams of sodium was dissolved in 400 milliliters of anhydrous methanol and 23.4 grams of purified diphenol sulfoxide was dissolved in the resulting solution. To this a solution of 18.9 grams of anhydrous stannous chloride was added slowly during stirring. The precipitate was filtered, washed with methanol, and dried. After leaching with water and drying it weighed 20.7 grams. On heating, the product decomposed before it melted.

For the tests referred to below stannous diphenol sulfoxide was used, and its effect was compared with that of widely used commercial stabilizers identified herein simply as stabilizer No. 1 and stabilizer No. 2. Two per cent of each stabilizer was added to the latex resulting from emulsion copolymerization of butadiene and styrene. A blank containing no stabilizer was also used for comparison. The various latices were coagulated with low-iron aluminum sulfate. The coagula were dried and aged. A record of any discoloration was kept together with differences occurring in the physical properties of the samples as determined by feeling and pulling the copolymer to determine whether it had cured or set-up to any extent. The results of the color and hand tests are recorded in the following table:

TABLE I
*Copolymer aging*

| Stabilizer | After Drying 20 Hrs. at 75° C., Color & Hand Test | Aging at 110° C. | | |
|---|---|---|---|---|
| | | One Day, Color & Hand Test | Two Days, Color & Hand Test | Four Days Color & Hand Test |
| diphenol sulfoxide | Light lavender; no deterioration. | Light brown slightly set up. | Somewhat hardened | Hardened. |
| stannous diphenol sulfoxide. | Cream color; no deterioration. | Light brown; unchanged. | Light brown; unchanged. | Light brown; unchanged. |
| Stabilizer No. 1 | Bluish-gray; no deterioration. | Brown; very slightly set up. | Dark brown; somewhat set up. | Dark borwn; set up. |
| Stabilizer No. 2 | Red-brown; no deterioration. | Brown; unchanged | Dark brown; very slightly set up. | Dark brown; somewhat set up. |
| blank | Light brown; no deterioration. | Somewhat hardened | Hardened | |

The above data show that stannous diphenol sulfoxide is superior to the sulfoxide itself and to the other well-known stabilizers, from the standpoint of preservation of the physical properties and preservation of color. It is greatly superior to the blank which contained no stabilizer.

The coagula containing the test material and stabilizer No. 1 were compounded according to the following formula:

*Formula*

| | Parts by weignt |
|---|---|
| Copolymer containing 2% stabilizer | 100.00 |
| Coumarone resin | 10.00 |
| Triethyl trimethylene triamine | 1.10 |
| Magnesium oxide | 8.00 |
| Wax | 2.00 |
| Zinc oxide | 100.00 |
| Ultramarine blue | 0.10 |
| Titanium dioxide | 30.00 |
| Sulfur | 4.00 |

The different compositions were cured 30, 50, and 70 minutes at 300° F. The following table records for each property the average values for these three cures.

TABLE II
*Physical properties of vulcanizate*

| Stabilizer | 300% Modulus | Tensile | Elongation |
|---|---|---|---|
| stannous diphenol sulfoxide | 270 | 1,170 | 505 |
| Stabilizer No. 1 | 330 | 1,020 | 430 |

(Modulus and tensile strength are referred to herein as pounds per square inch.)

The results show that the vulcanizate containing the stannous compound has physical properies comparable to those of the control sabilizer.

The vulcanizates obtained from the different cures, as above described, were subjected to exposure tests the results of which are recorded in the next two table. In the next table the results of artificial exposure tests are recorded:

TABLE III
*Artificial exposure tests*

| Stabilizer | Fadeometer at 125° F. | | G. E. Sunlamp at 7 inches | |
|---|---|---|---|---|
| | 5 Hours | 10 Hours | 8 Hours | 16 Hours |
| stannous diphenol sulfoxide. | White | White | White | Light cream. |
| Stabilizer No. 1 | Cream | Tan | Tan | Dark tan. |

Natural exposure tests were conducted on tapered dumb-bell strips cured 50 minutes at 300° F. while the strips were stretched 12½ per cent. The aging was conducted in Akron, Ohio, and began in May. The results are recorded in the following table:

TABLE IV
*Natural exposure tests*

| Stabilizer | One Month | Four Months |
|---|---|---|
| stannous diphenol sulfoxide | White | White. |
| Stabilizer No. 1 | Light tan | Tan. |

The vulcanizate containing stannous diphenol sulfoxide withstood the artificial and natural exposure tests better than the stock containing the commercial stabilizer.

The example is illustrative. Variations may be made within the scope of the invention which is defined by the appended claims.

What I claim is:

1. The process of stabilizing rubber-like copolymer of a conjugated-diene monomer and a vinyl aromatic monomer which comprises mixing therewith a small amount of a stabilizer of the class consisting of stannous diphenol sulfoxide, stannous di(halogen-substituted phenol) sulfoxides, and stannous di(hydrocarbon-substituted phenol) sulfoxides in which the total of the carbon atoms substituted on each phenol nucleus does not exceed twenty.

2. The process of stabilizing rubber-like copolymer of styrene and 1,3-butadiene which comprises adding to the latex resulting from emulsion copolymerization thereof, a small amount of stannous diphenol sulfoxide and coagulating.

3. The process of stabilizing rubber-like copolymer of styrene and 1,3-butadiene which comprises adding to the latex resulting from emulsion copolymerization thereof, a small amount of a stannous di-alkylphenol sulfoxide in which the total of the carbons in the alkyl substituents in each phenol nucleus does not exceed twenty, and coagulating.

4. The process of producing a stabilized vulcanizate which comprises sulfur-curing rubber-like copolymer of 1,3-butadiene and styrene in the presence of a small amount of stannous diphenol sulfoxide.

5. The process of producing a stabilized vulcanizate which comprises sulfur-curing rubber-like copolymer of 1,3-butadiene and styrene in the presence of a small amount of a stannous di-alkylphenol sulfoxide in which the total of the carbons in the alkyl substituents in each phenol nucleus does not exceed twenty.

6. Rubber-like copolymer of a conjugated-diene monomer and a vinyl aromatic monomer which contains a small amount of a stabilizer of the class consisting of stannous diphenol sulfoxide, the stannous di(halogen-substituted phenol) sulfoxides, and the stannous di(hydrocarbon-substituted phenol) sulfoxides in which the total of the carbons in the alkyl substituents in each phenol nucleus does not exceed twenty.

7. Uncured rubber-like copolymer of 1,3-butadiene and styrene stabilized with a small amount of stannous diphenol sulfoxide.

8. Uncured rubber-like copolymer of 1,3-butadiene and styrene stabilized with a small amount of a stannous di-alkylphenol sulfoxide in which the total of the carbons in the alkyl substituents in each phenol nucleus does not exceed twenty.

9. Vulcanizate of rubber-like copolymer of styrene and 1,3-butadiene stabilized with a small amount of stannous diphenol sulfoxide.

10. Vulcanizate of rubber-like copolymer of styrene and 1,3-butadiene stabilized with a small amount of a stannous di-alkylphenol sulfoxide in which the total of the carbons in the alkyl substituents in each phenol nucleus does not exceed twenty.

HARRY E. ALBERT.

No references cited.

Certificate of Correction

Patent No. 2,514,210                                              July 4, 1950

HARRY E. ALBERT

It is hereby certified that error appears in the printed specification of the above numbered patent requiring correction as follows:

Column 1, line 8, for "piperlyene" read *piperylene*; line 38, for "(2,4-tert-octylphenol)" read *(2,4-di-tert-octylphenol)*; columns 3 and 4, Table I, fifth column thereof, line 3, for "borwn" read *brown*; column 3, line 62, for "table", first occurrence, read *tables*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*